(12) United States Patent
Ditzel et al.

(10) Patent No.: US 7,775,414 B2
(45) Date of Patent: Aug. 17, 2010

(54) CONSUMABLE INSERT AND METHOD OF USING THE SAME

(75) Inventors: Peter J. Ditzel, Orlando, FL (US); Srikanth Kottilingam, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 1601 days.

(21) Appl. No.: 10/679,080

(22) Filed: Oct. 4, 2003

(65) Prior Publication Data

US 2005/0072830 A1 Apr. 7, 2005

(51) Int. Cl.
*B23K 35/14* (2006.01)
(52) U.S. Cl. ............ 228/56.3; 228/245; 228/246; 228/248.1
(58) Field of Classification Search ............ 228/108, 228/244, 245, 246, 247, 248.1, 248.5, 56.3; 219/85.21, 121.53, 121.52; 164/462, 463; 428/635, 678, 680, 560, 606, 607, 614, 655; 29/171.1, 17.4; 148/22, 23, 24, 400, 403, 148/426, 435

See application file for complete search history.

(56) References Cited

U.S. PATENT DOCUMENTS

| | | | | |
|---|---|---|---|---|
| 2,219,462 A | * | 10/1940 | Wissler | 219/146.22 |
| 2,613,304 A | * | 10/1952 | Colinet | 252/512 |
| 3,118,760 A | * | 1/1964 | Avery et al. | 428/385 |
| 3,476,528 A | * | 11/1969 | Bliss | 428/553 |
| 3,692,501 A | * | 9/1972 | Hoppin et al. | 428/636 |
| 3,753,794 A | * | 8/1973 | Paulonis et al. | 428/607 |
| 4,148,973 A | | 4/1979 | Sexton et al. | |
| 4,162,349 A | * | 7/1979 | Elam et al. | 428/614 |
| 4,209,570 A | | 6/1980 | DeCristofaro et al. | |
| 4,250,229 A | * | 2/1981 | Kear et al. | 428/606 |
| 4,253,870 A | | 3/1981 | DeCristofaro et al. | |
| 4,283,225 A | | 8/1981 | Sexton et al. | |
| 4,314,661 A | | 2/1982 | DeCristofaro et al. | |
| 4,316,572 A | | 2/1982 | Sexton et al. | |
| 4,316,573 A | | 2/1982 | DeCristofaro | |
| 4,405,391 A | | 9/1983 | DeCristofaro | |
| 4,448,853 A | * | 5/1984 | Fischer et al. | 428/607 |
| 4,477,012 A | | 10/1984 | Holland et al. | |
| 4,480,016 A | | 10/1984 | Henschel | |
| 4,508,257 A | | 4/1985 | Bose et al. | |
| 4,690,876 A | | 9/1987 | Mizuhara | |
| 4,700,881 A | * | 10/1987 | Ryan | 228/194 |
| 4,710,235 A | * | 12/1987 | Scruggs | 419/7 |
| 4,712,603 A | | 12/1987 | Bose et al. | |

(Continued)

OTHER PUBLICATIONS

About Flux-Cored Wires. Reprint from Gases and Welding Distributor magazine.

(Continued)

*Primary Examiner*—George Wyszomierski
*Assistant Examiner*—Michael Aboagye

(57) ABSTRACT

A consumable insert (10) formed of material particles (14) contained within a sheath (12). The particles may be a melting point depressant that has a concentration that is greater in a center region (16) of the insert than in the surface region (18) of the insert, thereby facilitating complete melting of the insert during a transient liquid phase bonding process. Alternatively, the particles may be a low-ductility material, such as a superalloy or an MCrAlY alloy, contained within a high ductility sheath material formed into a ribbon shape, thereby allowing the low-ductility material to be delivered in ribbon form during a coating process.

12 Claims, 1 Drawing Sheet

U.S. PATENT DOCUMENTS

| | | | |
|---|---|---|---|
| 4,726,854 A * | 2/1988 | Olson et al. ............... | 148/24 |
| 4,745,037 A | 5/1988 | DeCristofaro et al. | |
| 4,752,334 A * | 6/1988 | Nadkarni et al. ............ | 75/235 |
| 4,801,072 A | 1/1989 | Henschel | |
| 4,886,203 A | 12/1989 | Puzrin et al. | |
| 5,127,969 A | 7/1992 | Sekhar | |
| 5,158,229 A | 10/1992 | Bose et al. | |
| 5,289,967 A * | 3/1994 | Bampton et al. ............ | 228/190 |
| 5,364,010 A | 11/1994 | Mizuhara et al. | |
| 5,372,298 A * | 12/1994 | Glaeser ..................... | 228/195 |
| 5,957,365 A * | 9/1999 | Anthon ..................... | 228/56.3 |
| 6,004,683 A * | 12/1999 | Rafferty et al. ............ | 428/551 |
| 6,060,174 A * | 5/2000 | Sabol et al. ................ | 428/610 |
| 6,098,871 A * | 8/2000 | Cairo et al. ................ | 228/194 |
| 6,124,569 A * | 9/2000 | Bonnet et al. ............ | 219/146.1 |
| 6,165,290 A | 12/2000 | Rabinkin | |
| 6,193,930 B1 | 2/2001 | Allnatt | |
| 6,200,690 B1 | 3/2001 | Rabinkin | |
| 6,276,595 B1 | 8/2001 | Bruck | |
| 6,386,426 B1 * | 5/2002 | Tadauchi et al. ............ | 228/117 |
| 6,508,000 B2 | 1/2003 | Burke et al. | |
| 6,534,194 B2 * | 3/2003 | Weihs et al. ................ | 428/635 |
| 6,551,421 B1 | 4/2003 | Rabinkin | |
| 6,984,358 B2 * | 1/2006 | Spencer ..................... | 420/463 |
| 2002/0127135 A1 * | 9/2002 | Ohara et al. ................ | 420/531 |
| 2004/0084423 A1 * | 5/2004 | Grossklaus et al. .... | 219/121.45 |
| 2004/0126612 A1 * | 7/2004 | Shinkai et al. .............. | 428/627 |
| 2004/0134966 A1 * | 7/2004 | Chang et al. ................ | 228/56.3 |
| 2006/0027625 A1 * | 2/2006 | Dockus et al. ............. | 228/56.3 |

OTHER PUBLICATIONS

Fortuna, Dientje. Braze Build-up on Worn or Damaged Surfaces Without the Use of Cements or Binders. Sulzer Metco, 2002.

* cited by examiner

CONSUMABLE INSERT AND METHOD OF USING THE SAME

FIELD OF THE INVENTION

This invention relates generally to the field of materials, and more particularly to consumable inserts used in metals joining processes.

BACKGROUND OF THE INVENTION

A material that is melted and reformed as part of a joint between two work pieces during a welding or brazing process is commonly called a consumable insert. Consumable inserts may take many forms depending upon geometry of the joint and the materials being joined. Consumable inserts having a generally thin, flat shape are commonly called ribbon inserts because their shape suggests the shape of a ribbon. If the thickness of the material is sufficiently thin, the ribbon insert may be referred to as a foil. Ribbon inserts are limited to ductile materials, since the cold working necessary to form the material into the ribbon shape can only be accomplished with a ductile material. Consumable non-ductile materials are typically introduced into a metals joining process in particulate form. Powder feed devices used to store, handle and distribute such non-ductile materials typically require that the particulate material to be in the shape of spheres in order to facilitate the smooth movement of the particles through the device mechanism.

A process that has been used successfully for repair and material addition to superalloy components is known by several different names: diffusion bonding; diffusion brazing; liquid phase diffusion sintering; and transient liquid phase bonding. These names generally refer to a process wherein a consumable material is melted at a temperature that is less than the liquidous temperature of a work piece and then is caused to solidify to become integral with the work piece. The consumable material may typically include a melting point depressant such as boron or silicon to ensure that the consumable material will melt at a temperature that does not risk melting of the work piece. The work piece and consumable material are held at an elevated temperature for a sufficient interval to promote diffusion of the melting point depressant into the work piece material. As the melting point depressant diffuses, the melting point of the remaining consumable material will increase and the liquid material will solidify to form the desired joint or coating. Consumable inserts used for the transient liquid phase bonding of superalloy materials may be formed of nickel, with the boron melting point depressant having been diffused into the nickel substrate.

BRIEF DESCRIPTION OF THE DRAWINGS

These and other advantages of the invention will be more apparent from the following description in view of the drawings that show.

DETAILED DESCRIPTION OF THE INVENTION

Figure 1:
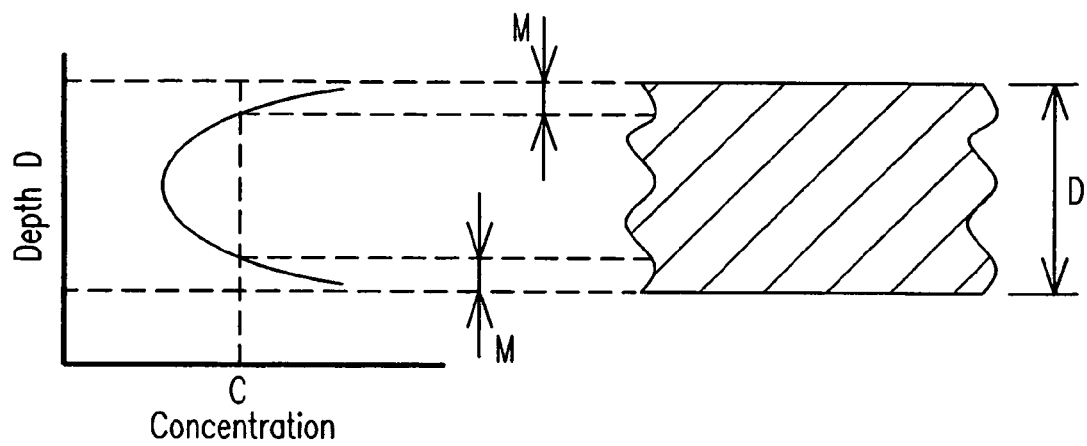
FIG. 1 is an illustration of the distribution of melting point depressant across the thickness of a prior art transient liquid phase diffusion bonding foil.

Transient liquid phase bond joints formed in superalloy components sometimes exhibit evidence of incomplete melting of the bonding foil that is used as the consumable insert for such joints. The present inventors have recognized that such incomplete melting may be a result of the distribution of melting point depressant that is present in prior art consumable inserts. When a melting point depressant such as boron, nickel or phosphorous is diffused into a substrate material such as nickel, the concentration of the melting point depressant will vary across the thickness of the substrate. As illustrated in FIG. 1, the concentration of melting point depressant will be the highest in the exterior surface regions of the insert and will be the lowest in the center region of the insert. As a result, the liquidous temperature of the center region of the insert will be higher than the liquidous temperature of the exterior surface regions. For a given bonding temperature, regions of melting M will exist proximate the exterior surfaces of the insert where the concentration of melting point depressant C is sufficiently high. This can lead to the preferential melting of the material on the outside of the insert, thus leaving unmelted material or delayed melting in the center of the insert.

Figure 2:
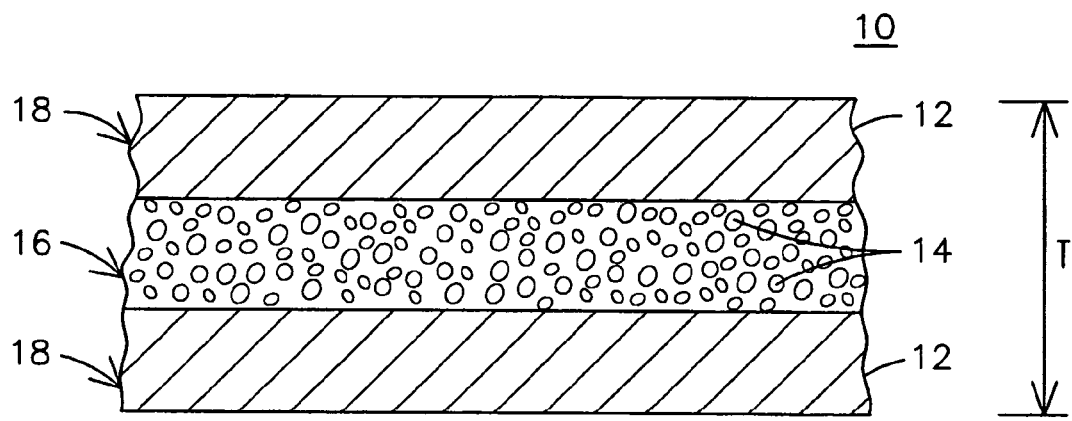
FIG. 2 is a partial cross-sectional view of an improved consumable insert.

The present inventors have innovatively developed a consumable insert having a concentration of a melting point depressant that is greater proximate a center region of the insert than proximate an exterior surface region of the insert. One such improved consumable insert 10 is illustrated in FIG. 2. Consumable insert 10 is formed as a sheath 12 filled with particles of a melting point depressant 14. The concentration of the melting point depressant 14 is greater proximate the center region 16 of the insert 10 than proximate the exterior surface regions 18 of the insert 10. The sheath 18 may be nickel, pure iron, stainless steel, gold or other material with sufficient ductility to be formed into a desired shape. The consumable insert 10 may take the form of a foil having a thickness T of a little as 1-2 mils, or it may take the form of a relatively thicker ribbon with a thickness T of less than or approximately 15 mils, or even thicker for example.

In one embodiment for use in a transient liquid phase bonding process for superalloy materials such as alloys 738, 939 or CM 247, the sheath 18 may be formed of nickel and the melting point depressant 14 may be particles of boron, silicon or phosphorous. The particles would typically have a size range of finer than ASTM E11 No. 80. Advantageously, the particles need not be limited to spherical shapes, thereby allowing the use of relatively less expansive particle shapes. The concentration of the melting point depressant 14 near the center region 16 of the consumable insert 10 facilitates the transient liquid phase reaction in the center region 16, thus permitting normal diffusion to liquate the sheath 12 and to incorporate it into the joint.

Figure 3:
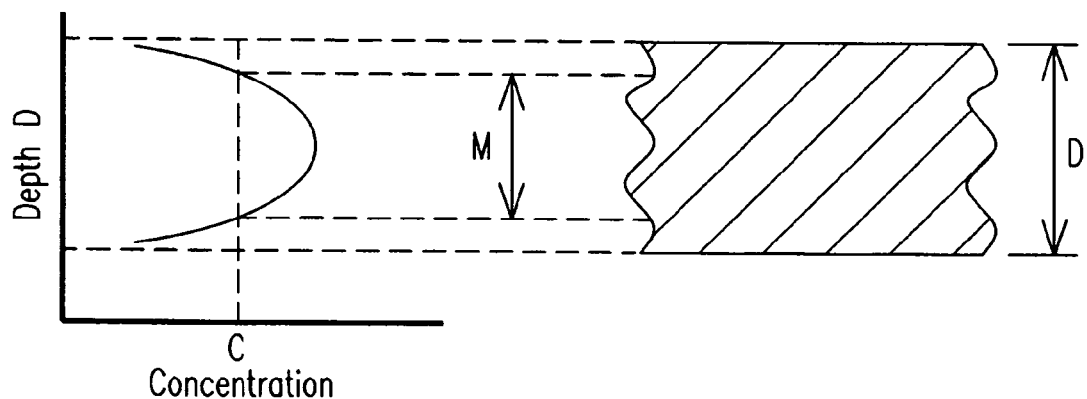
FIG. 3 is an illustration of the distribution of melting point depressant across the thickness of the consumable insert of FIG. 2.

The consumable insert 10 may be formed by any of several processes. In a first manufacturing process, a continuous flat metal strip of the sheath material 12 is fed through shaping dies that bend the strip into a U-shape. The U-shape passes under a hopper to receive particles of melting point depressant 14. The particle-filled U-shape then travels through closing dies that close it into a tubular form, compressing the particles 14 inside. This tubular form is then fed through additional dies to press together and to flatten and elongate the shape to its desired ribbon shape, thereby further compressing the particles of melting point depressant 14 therein. A portion or all of the particles 14 may become embedded into the sheath material 12. The amount of cold working of the sheath 12 and the amount of particles 14 will determine the final distribution of the particles 14 across the thickness T of the consumable insert 10. A typical distribution is illustrated in FIG. 3, which can be compared to the prior art distribution of FIG. 1. The concentration of melting point depressant is greatest in a center region of the insert. Thus, for a given bonding temperature, a region of melting M will exist proximate the center of the insert where the concentration of melting point depressant C is sufficiently high, thereby facilitating complete melting of the insert.

In a second alternative manufacturing process, the consumable insert 10 may be formed by placing the particles of melting point depressant 14 onto a lower plate of sheath material 12 and then covering the particles with an upper plate of sheath material 12. The thickness of each plate at this stage may be about 60 mils or whatever other thickness is conveniently handled. The plates are then pressed together such as by rolling to achieve desired thickness, such as a ribbon having a total thickness T of as little as 1 mil or as much as 15 mils or more. The adjoining edges of the plates may be sealed, such as by welding, prior to the rolling process to capture the particles there between in order to prevent particles from being squeezed from between the plates.

In a third alternative manufacturing process, the hollow center of a tube of sheath material 12 may be filled with particles of melting point depressant material 14 and the ends of the tube sealed. The tube is then flattened with the tube walls pressed together to achieve a desired cross-sectional thickness for consumable insert 10.

A diffusion heat treatment may be applied to the consumable insert 10 in conjunction with the mechanical flattening processes described above in order to encourage some diffusion of the melting point depressant material 14 into the sheath material 12. Such heat treatment may create a chemical bond between the sheath material 12 and some of the particles 14, such as forming nickel-boron for applications of a nickel sheath 12 and a boron melting point depressant 14. A diffusion heat treatment might be carried out at 1500-1800° F. for up to 20 hours, for example. A desired cross-section and distribution of melting point depressant may be achieved by judicious selection of the original dimensions of the sheath material 12, the quantity of particles used 14, the mechanical rolling/flattening processes used, and the optional heat treatment regiment selected.

A transient liquid phase bonding process may include the step of forming a consumable insert to have a melting point depressant concentration that is greater proximate a center region of the insert than proximate an exterior surface region of the insert. The consumable insert is captured between two work pieces to be joined while the work pieces and the consumable insert are heated to a temperature sufficiently high to melt the consumable insert. The center region of the insert will be fully melted as a result of the higher concentration of melting point depressant there. The temperature is maintained sufficiently high for the melting point depressant to diffuse into the work pieces to an extent sufficient for the consumable insert to solidify to form a joint between the work pieces. Such a joint should be free of unmelted insert material at its center.

Although no testing has been completed to date, it is expected that typical prior art transient liquid phase bonding processes, such as the one described in U.S. Pat. No. 6,508,000, incorporated by reference herein, may be used without alteration when using consumable insert 10 of the present invention.

The consumable insert 10 of the present invention is not limited to transient liquid phase bonding processes, but may also be advantageously applied to applications involving the deposition of non-ductile materials. Such materials may include superalloys, bond -coatings such as MCrAlY alloys, and other materials not readily available as wrought products. MCrAlY refers to the known family of alloys where M in the alloy is usually selected from the group of nickel, cobalt and iron or alloys thereof, and Y in the alloy is usually selected from the group of yttrium, lanthanum and hafnium. Prior art processes for depositing such non-ductile materials have been limited to using powder or weld rod, since it is not practical to form such non-ductile materials into a ribbon shape. The terms "ribbon" and "ribbon shape" are used herein as they are commonly used in the field of welding, brazing and material deposition to include relatively thin, flat geometries with a small height/width ratio. The width of such flat products may vary from typically a half inch or less to several inches or more, or they may be in the form of a wide foil having a width of a foot or more. Powder deposition can create contamination concerns and is generally limited to essentially vertical orientations in order to make use of gravity for holding the powder in place until it is melted. The powders used for powder deposition processes are also the relatively expensive sphere shape required to ensure the effective operation of the powder feeding equipment. A laser generally provides heat addition, since powders are problematic for gas flowing process such as TIG welding.

In an embodiment for the deposition of a non-ductile material, the sheath 12 may be nickel, nickel alloy, or other material having sufficient ductility to be formed into a desired ribbon shape. The powder 14 may be any known nickel-based or cobalt-based superalloy or an MCrAlY material, or any other material that is not sufficiently ductile to be formed into a ribbon shape. Such materials may have ductility of less than 18% tensile elongation, or less than 15% tensile elongation, or less than 10% tensile elongation, for example. The relative volumes and chemical make-up of the sheath 12 and the non-ductile particles 14 are selected so that the coating resulting from the melting of the consumable insert 10 will have a desired chemistry.

In one application, a component having an MCrAlY coating is removed from service and a damaged portion of the coating is removed and the exposed surface is cleaned using known techniques. A repair strip of consumable insert 10 is formed with an MCrAlY powder 14 being encased in a nickel-containing sheath 12. The MCrAlY of the insert 10 may have the same chemistry as the original MCrAlY coating or it may be a different chemistry. The consumable insert 10 is ductile enough to be bent and formed to the shape of the surface being repaired. The insert 10 is delivered to the component surface and heat is applied by any known technique to melt the insert. The resulting melt is then cooled to form the repaired area of the coating. In this manner a relatively wide strip of low ductility repair material may be deposited without the use of a loose powder and without the associated powder feed mechanism. The insert 10 may have a suitable large thickness T, for example 15 mils, to achieve a desired thickness of repair material. The insert 10 may be spooled for use with a continuous deposition process.

While the preferred embodiments of the present invention have been shown and described herein, it will be obvious that such embodiments are provided by way of example only. Numerous variations, changes and substitutions will occur to

We claim as our invention:

1. A method of transient liquid phase bonding using a consumable insert, the method comprising:
   forming a consumable insert comprising a metal-comprising material and melting point depressant material, the melting point depressant material having a melting point depressant concentration that is greater proximate a center region of the insert than proximate an exterior surface region of the insert;
   capturing the consumable insert between two work pieces to be joined by transient liquid phase bonding;
   heating the work pieces and the consumable insert to a temperature sufficiently high to melt the consumable insert; and
   maintaining the temperature sufficiently high for the melting point depressant to diffuse into the work pieces to an extent sufficient for the consumable insert to solidify to form a joint between the work pieces,
   wherein forming the consumable insert further comprises:
      depositing particles of the melting point depressant into a hollow center of a tube of sheath material; and
      flattening the tube into a ribbon shape having the particles of the melting point depressant in the center region and having the sheath material in the exterior surface region.

2. The method of claim 1, further comprising selecting the sheath material to comprise nickel.

3. The method of claim 2, further comprising selecting the melting point depressant to comprise one of the group of boron, nickel and phosphorous.

4. A method of transient liquid phase bonding using a consumable insert, the method comprising:
   forming a consumable insert comprising a metal-comprising material and melting point depressant material, the melting point depressant material having a melting point depressant concentration that is greater proximate a center region of the insert than proximate an exterior surface region of the insert;
   capturing the consumable insert between two work pieces to be joined by transient liquid phase bonding;
   heating the work pieces and the consumable insert to a temperature sufficiently high to melt the consumable insert; and
   maintaining the temperature sufficiently high for the melting point depressant to diffuse into the work pieces to an extent sufficient for the consumable insert to solidify to form a joint between the work pieces,
   wherein forming the consumable insert further comprises:
      depositing particles of the melting point depressant into a U-shaped plate of sheath material;
      forming the U-shaped plate into a tube; and
      flattening the tube into a ribbon shape having the particles of the melting point depressant in the center region and having the sheath material in the exterior surface region.

5. A method of transient liquid phase bonding using a consumable insert, the method comprising:
   forming a consumable insert comprising a metal-comprising material and melting point depressant material, the melting point depressant material having a melting point depressant concentration that is greater proximate a center region of the insert than proximate an exterior surface region of the insert;
   capturing the consumable insert between two work pieces to be joined by transient liquid phase bonding;
   heating the work pieces and the consumable insert to a temperature sufficiently high to melt the consumable insert; and
   maintaining the temperature sufficiently high for the melting point depressant to diffuse into the work pieces to an extent sufficient for the consumable insert to solidify to form a joint between the work pieces,
   wherein forming the consumable insert further comprises:
      depositing particles of the melting point depressant onto a lower plate of sheath material;
      covering the particles with an upper plate of sheath material; and
      flattening the upper and lower plates together to a desired thickness to form the consumable insert.

6. The method of claim 5, further comprising sealing adjoining edges of the upper plate and the lower plate together to capture the particles there between prior to the step of flattening.

7. The method of claim 5, further comprising subjecting the consumable insert to a diffusion heat treatment regiment prior to the step of heating.

8. A method of material deposition utilizing a consumable insert, the method comprising:
   providing a consumable insert comprising a sheath formed to a desired ribbon shape and particles of an MCrAlY alloy material contained by the sheath; and
   melting the insert onto a surface of a work piece; and
   allowing the melt to cool to form a coating.

9. A consumable insert comprising:
   a sheath having a desired ribbon shape; and
   particles of an MCrAlY alloy material exhibiting a ductility of less than 18% tensile elongation contained by the sheath.

10. The consumable insert of claim 9, wherein the material exhibits a ductility of less than 15% tensile elongation.

11. The consumable insert of claim 9, wherein the material exhibits a ductility of less than 10% tensile elongation.

12. The consumable insert of claim 9, wherein the sheath comprises nickel.

* * * * *